W. H. BUTTERWORTH.
Hay Spreader.
No. 84,409.
Patented Nov. 24, 1868.
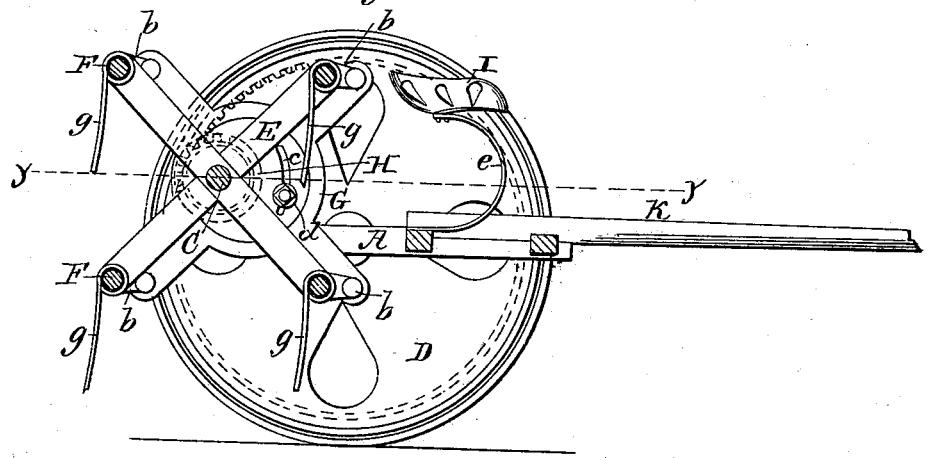
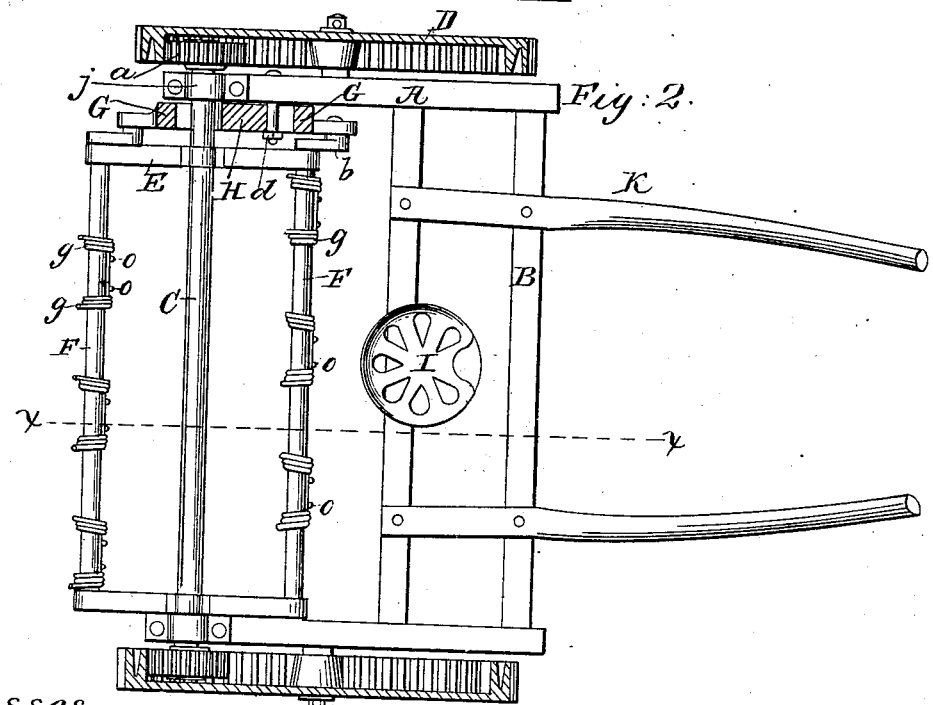

UNITED STATES PATENT OFFICE.

WILLIAM H. BUTTERWORTH, OF TRENTON, NEW JERSEY.

Letters Patent No. 84,409, dated November 24, 1868.

IMPROVEMENT IN HAY-SPREADERS.

The Schedule referred to in these Letters Patent and making part of the same.

*To all whom it may concern:*

Be it known that I, WILLIAM H. BUTTERWORTH, of Trenton, in the county of Mercer, and State of New Jersey, have invented certain new and useful Improvements in Hay-Spreaders; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to hay-spreading machines, and consists in the novel construction and arrangement of certain mechanical devices, in connection with the reel, fork-bars, and forks thereon, by which a novel motion is given to the latter, which secures a thorough tedding of the grass, and avoids all clogging by it.

In the drawings—

Figure 1 is a vertical section on the line $x$–$x$ of fig. 2, and

Figure 2 is a horizontal section on the line $y$–$y$ of fig. 1.

In constructing my machine, I make an ordinary frame, of any size desired, of two side pieces, A, with two front cross-pieces, B, to which shafts K and a seat I, on a spring, $e$, may be attached, as shown in figs. 1 and 2.

This frame I mount on a pair of wheels, D, having their peripheries made so as to extend inwardly, beyond their inner face, and provided, if desired, on the inside of the projection, with cogs for gearing.

On the rear end, or near it, of the frame, I mount a reel, J, in journal-boxes, $f$, on the upper side of the side pieces A, or on blocks attached to them. The shaft C of the reel is provided with journals, which fit into the boxes $f$, and extend beyond the side pieces A, and near enough to the wheels D to allow pinion-wheels $a$ to be attached to its ends, and gear into the driving-wheels D, by connecting with the cogs, on the under side of their periphery, as shown in figs. 1 and 2, or in any other desired manner.

The end of the shaft C extends through an eccentric, H, which is provided with slot $c$, so as to be adjusted and fastened to the side of the frame by a screw, $d$, as shown in fig. 1. This eccentric is thus both adjustable and stationary.

The reel I make with two or more heads, E, rigidly attached to the shaft C, and provide their peripheries with journal-boxes, or their equivalents, to receive the journals of the fork-bars F, which extend between the heads of the reel. These fork-bars F extend through one of the heads of the reel, and have connected to their ends cranks $b$, which are pivoted to the periphery, or to arms on the periphery of a ring, G, arranged to rotate easily about the eccentric, H, as shown in fig. 1.

On the fork-bars F, I place a series of hay-forks, $g$.

These forks I make in pairs. I coil each pair loosely about the bar, for the purpose of giving them elasticity, and bend them, so as to leave a straight piece or part between each coil, to run parallel with the bar, for the purpose of attaching them rigidly to it, by means of staples, $o$, as shown in fig. 2.

In operating my hay-spreader, thus constructed, I first fix the angle at which I desire the forks $g$ to stand in moving. This I do by means of the adjustable eccentric, H, for, as this is moved, it moves the rotating ring G, which turns the cranks $b$ attached to the fork-bars F, and consequently the teeth or hay-forks $g$.

When the eccentric, H, is thus adjusted so as to give the desired angle to the teeth of the hay-forks, I fasten it in place firmly by the screw $d$. This done, the machine is ready for use. As it moves forward, the wheels D give motion to the wheels $a$, which, being rigidly attached to the shaft C, cause the reel to rotate, and in rotating, by means of the cranks $b$, connecting the fork-bars F with the ring G, give motion to the latter about the eccentric, H.

As the ring G moves around the eccentric, H, it causes the fork-bars F, in revolving about the central shaft C, to keep their radial lines parallel, and consequently the teeth of the hay-forks on the different fork-bars parallel, so that they will keep the same angle at which they were set, so long as the eccentric remains in the same position.

Another important and most useful effect of this arrangement is, that during a portion of the revolution of the reel they will move within the orbit of its circumference, and, during the remainder of the revolution, without the same orbit; moving without, as they stir or tedder the grass and rise from it, and within, as they approach and pass round the top of the reel.

The object of thus keeping the hay-forks on the different fork-bars parallel, and providing for their being set at any desired angle, as well as for their moving within and without the orbit of the circumference of the reel, is apparent. The hay-forks on each fork-bar strike or stir the grass at the same time, on the same line, and at the same angle, and as they rise beyond the orbit of the circumference of the reel, they leave the grass simultaneously, drawing, as it were, away from or out of it, and then shorten the distance they have to travel, by passing to the under side of the fork-bar, and only projecting beyond it as they come down to the grass again.

By the arrangement of the loosely-revolving ring, as herein described, it becomes susceptible or capable of receiving other devices for similarly operating all the hay-fork bars of a hay-spreader, thus completely doing away with the necessity and expense of duplicating it as well as the eccentric.

This construction and arrangement is both simple and strong, and at the same time thoroughly performs its work.

It is obvious that each side of the spreader may be provided with an adjustable eccentric, having a loosely-rotating ring mounted on it, with cranks pivoted to its periphery, and attached to the fork-bars journalled in both heads of the reel, as this will only be duplicating the mechanical arrangements.

Having thus described my invention,

What I claim, is—

1. Eccentric, H, provided with a slot, c, so as to be adjusted as desired, substantially as herein described, and for the purpose set forth.

2. The combination of the adjustable eccentric, H, the rotating ring G, and the reel, having its rake-bars journalled therein, and connected by cranks b to the ring G, all arranged to operate as and for the purpose described.

WILLIAM H. BUTTERWORTH.

Witnesses:
ALBERT J. WHITTAKER,
JOHN BUTTERWORTH, Jun.